Dec. 31, 1929. J. F. NENZEL Re. 17,545
LAMP
Original Filed March 11, 1925
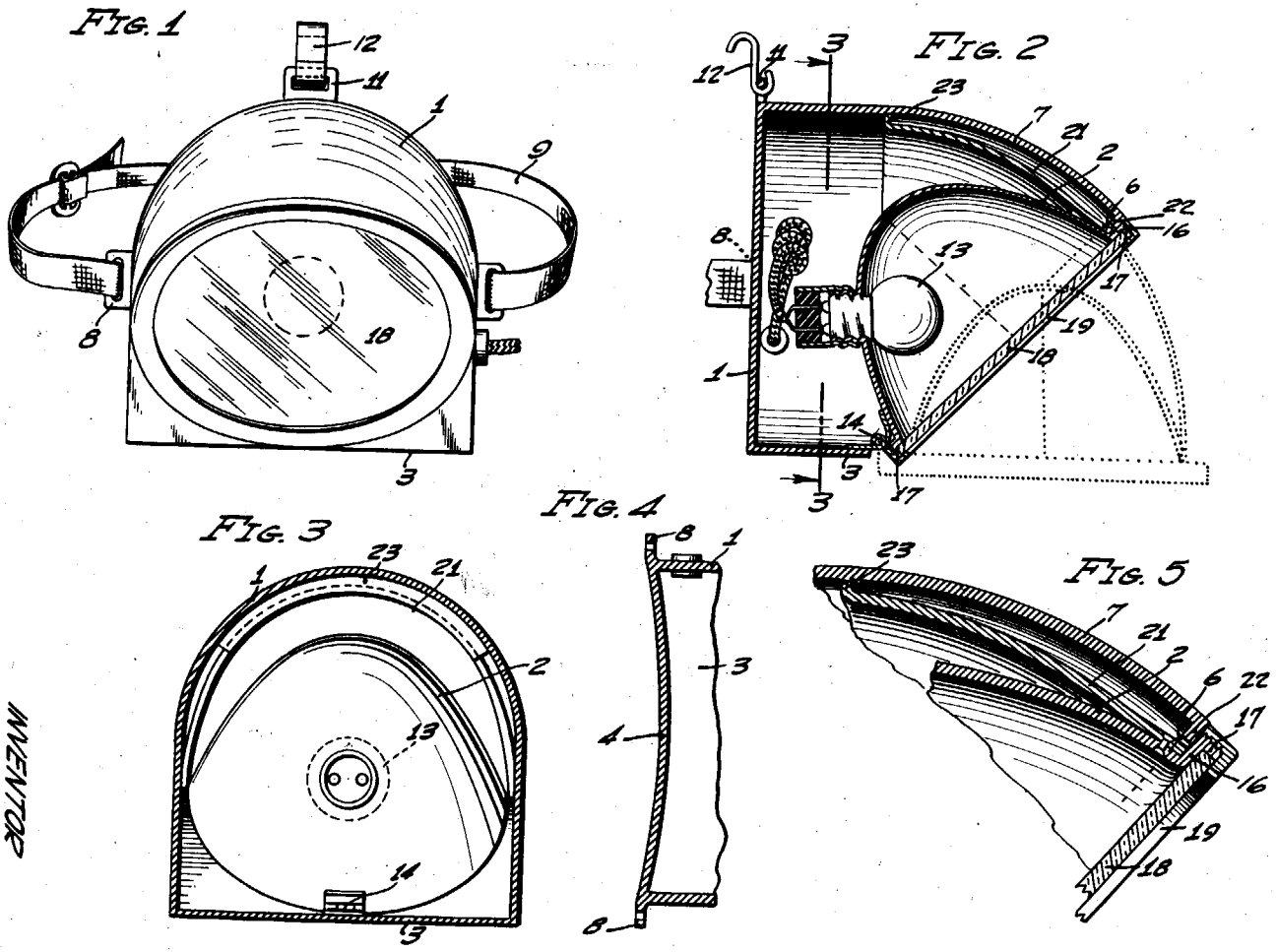
INVENTOR
JOSEPH F. NENZEL
BY Munn & Co.
ATTORNEYS Reissued Dec. 31, 1929 Re. 17,545

UNITED STATES PATENT OFFICE

JOSEPH F. NENZEL, OF LOS ANGELES, CALIFORNIA, ASSIGNOR TO NENZEL MANUFACTURING COMPANY, OF WILMINGTON, DELAWARE, A CORPORATION OF DELAWARE

LAMP

Original No. 1,619,213, dated March 1, 1927, Serial No. 14,777, filed March 11, 1925. Application for reissue filed August 18, 1928. Serial No. 300,555.

The present invention relates to improvements in lamps, and has particular reference to a lamp intended to be secured to a person without interfering with the use of his hands. A lamp of this character is particularly useful for miners who may secure the same to the hat or cap, or their clothes, but it is also convenient in many other situations as, for instance, to a physician who wishes to closely inspect throat or eyes, or other portions of the body of a patient and who may secure the lamp to the front of his head so that the rays of the light naturally fall upon the place to be inspected without requiring the use of the hands.

A particular feature of my lamp is that it represents a flat base so that it may be set on a table; that it presents a shaped rear wall fitting preferably on that part of the human body or other object to which it is intended to be attached, and a slanting light opening to which a reflector is hinged in such a manner that the reflector opening may be moved from a forwardly slanting position into a horizontal position while means are provided for automatically holding the reflector in any position to which it may be advanced.

Further objects and advantages of my device will appear as the specification proceeds.

The preferred forms of my invention are illustrated in the accompanying drawing, in which—

Figure 1 shows a front view of my lamp.

Figure 2 a vertical longitudinal section through the same.

Figure 3 a sectional view taken along line III—III of Figure 2.

Figure 4 a fragmentary horizontal section showing a slightly modified form, and

Figure 5 a detail sectional view through a portion of the housing and a portion of the reflector.

While I have shown only the preferred forms of the invention, it should be understood that various changes or modifications may be made within the scope of the claims hereto attached without departing from the spirit of the invention.

My lamp comprises in its principal features the light housing 1 of a reflector 2. The light housing 1 includes a flat base 3, a rear wall 4 which may be straight, as illustrated in Figure 2, or which may be curved to fit the outlines of the object the lamp is to be secured to, as illustrated in Figure 4, and a light opening 6 which slants forwardly from bottom to top preferably at an angle of about 45° to the base line.

The side wall of the housing is preferably made cylindrical except for the flat base and the overhanging portion 7 caused by the slanting light opening is curved along the top, as illustrated in Figure 2, to provide an arc of which the lower edge of the light opening is approximately the center. The light housing has ears 8 extending laterally from the rear wall thereof, the ears serving as attaching means for a band 9 by means of which the light housing may be secured to an object such as a hat, cap or the like. Another ear 11 extends from the top of the rear wall to receive a hook 12 by means of which the light may be suspended from a belt or similar object.

The reflector 2 which may be of any suitable form and which supports a light 13 on the inside thereof is hinged to the lower edge of the light opening, as shown at 14, and is provided with a flange 16 adapted to lie against the edge of the light opening. A collar 17 extends forwardly from the flange 16 and is adapted for reception of the lens 18 which is held in position by the ring 19 adapted to be threaded upon the collar 17. The reflector which is of smaller proportions than the light housing has a hood 21 secured to it near the flange 16 thereof, the hood being formed to run parallel to the projecting portion of the light housing and in spaced relation thereto so that the outer face of the hood is adapted to ride on an internal flange 22 formed in the light housing at the opening thereof; while at the same time an external flange 23 at the rear end of the hood is in sliding contact with the inner face of the projecting portion of the light housing, the hood being made to exert spring tension against the light housing and to hold the reflector in any position to which it may be advanced manually.

The advantages of my lamp will be readily understood from the foregoing description.

The lamp may be set on a table without any further support and will securely rest on the base 3. The lamp may be suspended from a belt or may be secured to a hat or any other suitable object by means of the band 9. Whatever support is selected for the lamp, the reflector may at any time be moved from the forward slanting poistion, illustrated in full lines in Figure 2, to the dotted line position or to any intermediate position, and will be firmly held in any desired position by the hood 21 which at the same time serves as a protector for the reflector when the same is projected from the light housing. The light moves with the reflector and the light rays may be thrown in any direction desired within the range of the turning movement of the reflector.

It might be mentioned in this connection that in addition to the uses mentioned in the first paragraph of the description many other uses will be found for my lamp; the lamp would, for instance render excellent service as a reading lamp if attached to the front of the head or might be secured to the back of the hand or wrist of an automobile driver to serve as a signalling device. When used as a reading lamp, a suitable colored lens might be selected to minimize or eliminate the reflection of light rays into the eyes.

I claim:

1. A miner's lamp comprising a housing having an opening in the front thereof, the upper forward part of said housing curving downwardly as it extends forwardly, said upper part extending forwardly of the base of the housing, a reflector set in said housing, said reflector being hinged at its lower forward edge to the lower forward edge of the base of the housing and closing the opening in said housing, and a hood secured to the top of the reflector, said hood pressing resiliently against said housing whereby it will maintain the reflector in a desired position relative to the housing.

2. A device of the class described comprising a substantially cylindrical housing having a flat base portion and its wall above the base portion extended on a downwardly curved arc beyond the forward side of the base portion to provide an opening at an angle approximating the radius of the arc, a reflector within the opening of said housing and hingedly mounted on the forward edge of the base portion for movement outwardly of the said opening, a lamp carried by said reflector and in a plane below the center thereof, means carried by the upper portion of said reflector and extending rearwardly within said housing for sliding contact with the upper wall portion thereof, and cooperative means carried by the upper wall portion of said housing and the inner side of said means for limiting the outward movement of the said reflector.

JOSEPH F. NENZEL.